INVENTOR
THEODORE W. KELLER
CHARLES W. GARVIN
JOHN G. MCMILLAN

Jan. 17, 1961 T. W. KELLER ET AL 2,968,576
PROCESS OF COATING A POLYETHYLENE SUBSTRATE WITH A
VINYLIDENE COATING AND RESULTANT ARTICLE
Filed July 19, 1955 6 Sheets-Sheet 3

INVENTORS
THEODORE W. KELLER
CHARLES W. GARVIN
JOHN G. MCMILLAN
BY Cushman, Darby & Cushman
ATTORNEYS

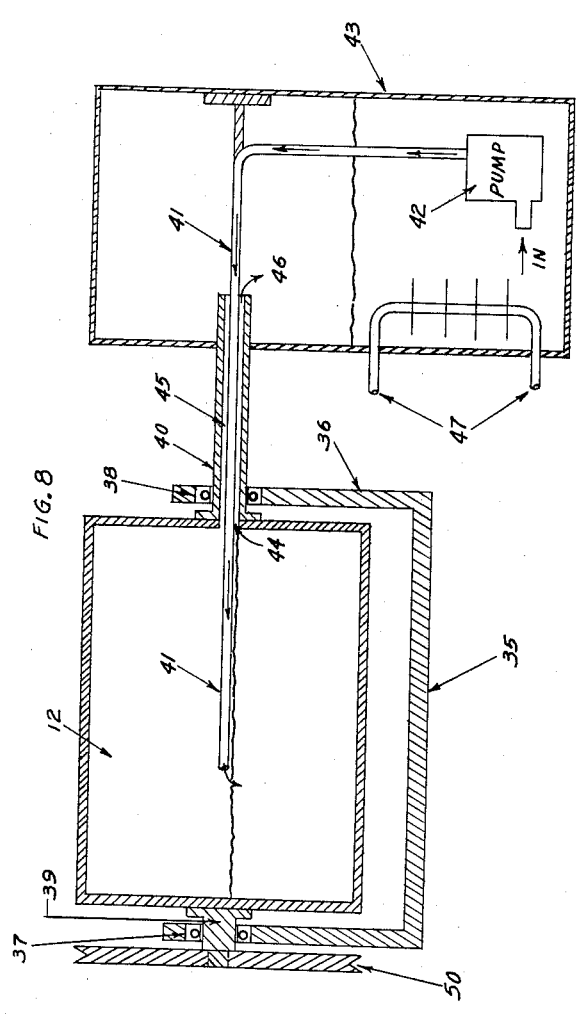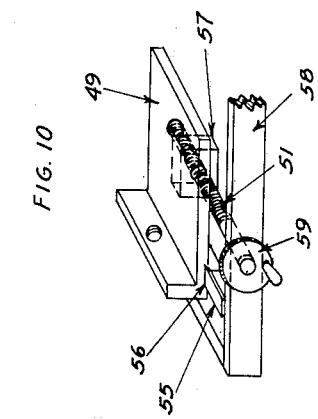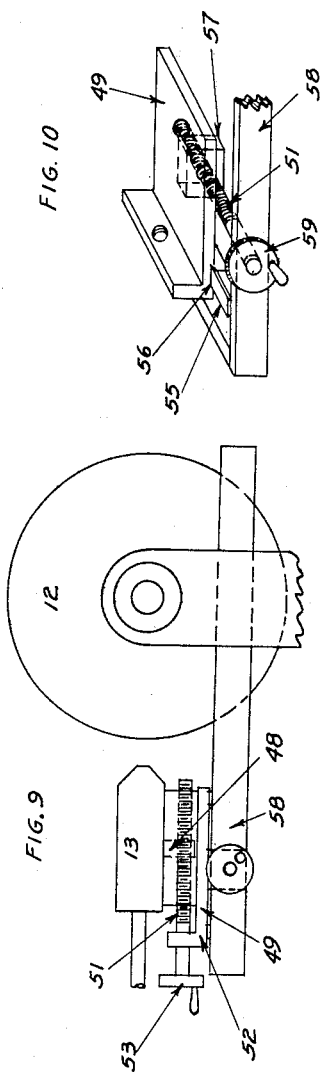

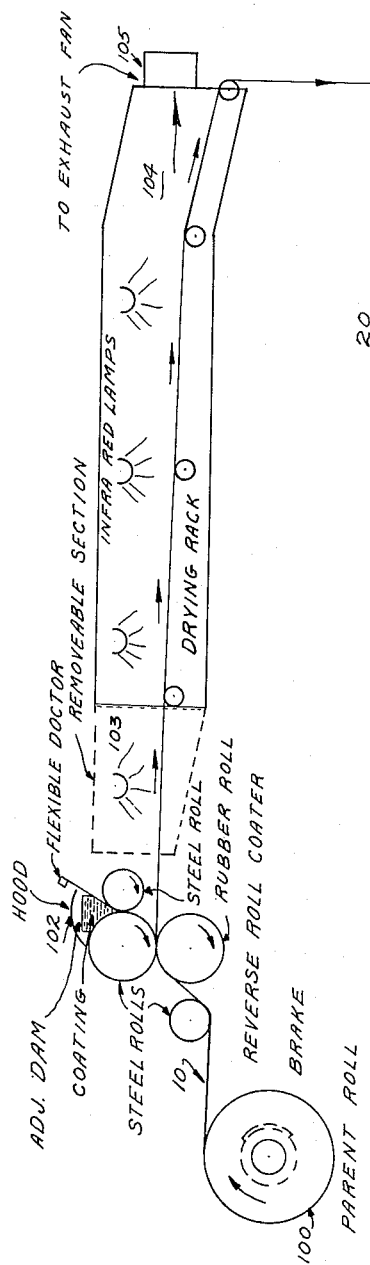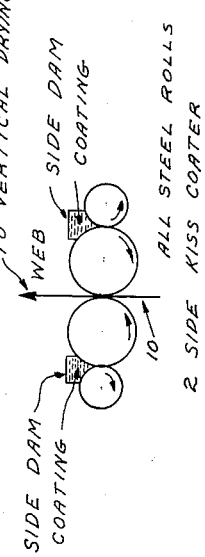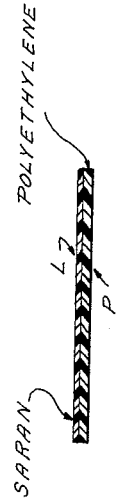

2,968,576

PROCESS OF COATING A POLYETHYLENE SUBSTRATE WITH A VINYLIDENE COATING AND RESULTANT ARTICLE

Theodore W. Keller and Charles W. Garvin, Council Bluffs, Iowa, and John G. McMillan, Omaha, Nebr., assignors, by direct and mesne assignments, to Howard Plastics, Inc., Council Bluffs, Iowa, a corporation of Iowa Filed July 19, 1955, Ser. No. 523,024

12 Claims. (Cl. 117—47)

The present invention relates to vinylidene chloride resin coated polyethylene.

The invention is a continuation-in-part of Theodore W. Keller et al., application Serial No. 326,544, filed December 17, 1952, the entire disclosure of which is incorporated by reference.

This invention relates to flexible wrappings, namely, bags, envelopes and similar containers, as well as sheeting, of polyethylene which have found outstanding use in the food, drug and process industries. For these various purposes, thin polyethylene films have been furnished by the various suppliers having a thickness or gauge of about 5/10,000 of an inch or less to 1/8 of an inch or more, usually about 1½ thousandths of an inch. Polyethylene films are recognized as having substantial liquid impermeability and a low moisture vapor transfer rate. However, the gas transmission rate or volatile vapor transmission rate of the polyethylene film is so high that it cannot be satisfactorily used for a number of purposes where it is eminently suited, were it not for this disability. We refer particularly to the food industry where, in the case of nut meats, potato chips, cheese, bacon and many other perishables, which are affected by air, oxygen, nitrogen, etc., rancidity or other undesirable chemical changes occur with the usual polyethylene envelope. In this connection bags, made of vinylidene chloride resin coated polyethylene, in accordance with this invention, have been used to package pickles without including a preservative, which it has heretofore been considered necessary to do to avoid spoilage occasioned by oxidation and bacterial or mold growth due to the entrance of air into the polyethylene bag. In other words, using a bag made of vinylidene chloride resin coated polyethylene, the gas barrier effect is so pronounced that pickles can be safely packaged for commercially salable periods without the necessity of including a preservative. In addition, gas or volatile vapor permeation of the bag allows foreign odors to diffuse into the sealed bag, which we found, for example, took place when food products were stored adjacent the perfume counter in a drug store. Likewise, vapors or gases diffusing from the contained sealed product frequently escape through the polyethylene envelope in such quantity, that not only the taste, flavor, odor and other qualities of the product are impaired, but such vapors impart odors and chemically affect other products with which they come in contact. Spices, spiced meats, bath salts and similar products, which have a striking or characteristic odor, are good examples of the latter. In the chemical industry, it is recognized that the diffusion of oxygen into the sealed envelope will cause chemical change or reactions of the contents which would impair their usefulness. Often, the contents of the polyethylene envelope will volatilize and the volatile vapors will permeate through the film to the exterior. For example, crystallized naphthalene, placed in a sealed bag of ordinary polyethylene, will volatilize within the envelope and the volatiles will diffuse out through the same at room temperature at almost the same rate as if the naphthalene had not been enclosed in the polyethylene envelope, and this is, likewise, true to some extent with solid carbon dioxide. We have mentioned only a few of the large number of instances which indicate the need for a polyethylene envelope or film in which the gas and volatile vapor transmission rate is substantially reduced.

An object of this invention is to provide a method by which the polyethylene film is treated to so reduce the gas transmission rate and the volatile vapor transmission rate that the scope of use of the film is substantially commercially widened and, at the same time, the bag or film is made even more liquid impermeable and the moisture vapor transfer rate is still further reduced.

It is a further object of the invention to provide a coated polyethylene film in which the barrier effects, just above-described, persist for commercially satisfactory periods of time, notwithstanding that the products are subjected to high temperatures, e.g., the boiling point of water, refrigeration, e.g., 0° F. and any commercial cooling or freezing temperatures, or ordinary shelf temperatures.

Another object of the invention is to prepare polyethylene which can be printed upon and then coated with a vinylidene chloride polymer.

Other objects will, in part, be obvious and, in part, become apparent from the subsequent description of the invention.

Any treatment of the polyethylene to render the same gas and vapor proof must necessarily be applied to a substantial area of the envelope, usually all of the surface of the container, and the treatment must be one which will uniformly produce a permanent barrier over the entire treated area. That is to say, in the treated area, there should not be spots or stripes where the barrier effect is either nil or so weak as to be ineffective. We have discovered, if the surface of the polyethylene is uniformly subjected, first to oxidative influences of the oxygen type, that the surface will be uniformly receptive and substantially permanently retentive of coating materials which will provide the desired gas and vapor barrier now lacking in polyethylene film. From our experiments, a satisfactory material for coating the film is Saran F-120, a copolymerization product of vinylidene chloride and acrylonitrile, made by Dow Chemical Company. However, when we tried to adhere a vinylidene chloride resin coating solution to the untreated surface of a polyethylene film, we found, after drying the coating, that it loosened and peeled badly upon flexing of the sheeting or envelope. This interposed a serious problem and, upon further research, we discovered that, when the surface of the film was first uniformly subjected to oxidative influences of the oxygen type, the previous difficulty of coating uniformly and permanently with a polyvinylidene chloride polymer was overcome, and sheeting and bags were obtained which were substantially gas and vapor proof, had a better transparency, and there was no loosening or peeling off of the coating upon flexure of the film. Our tests further revealed that the liquid and moisture resistance of the polyethylene was also improved. Vapors created inside of the bag did not diffuse through to the outside nor did air or other external vapors permeate into the interior of the bag in objectionable amount. The adherence of the coating was uniform over the entire area of the sheeting and the bags and this adherence persisted under all of the conditions which are encountered in commercial use, such as abrasion, high temperatures, flexing, freezing, greases and oils, moisture condensation, water, etc. In other words, all of the desirable properties of the polyethylene were retained and, in addition, a bag or envelope or wrapping produced in accordance with this invention had the ultimate desirable properties of being practically gas and vapor proof, as well as moisture proof and liquid proof. The coating of polyvinylidene chloride was extremely thin, but we found the foregoing results were obtained with thicknesses of polyvinylidene chloride varying from about 1/10,000 of an inch or less to 5/10,000 of an inch or more, and our examination of the polyethylene provided with such coatings or polyvinylidene chloride indicated that the union between the polyethylene base and the applied polyvinylidene chloride coating was, to all intents and purposes, integral.

Referring to the drawings,

Figure 1 is a diagrammatic flow sheet showing the manner in which the polyethylene film, either as flat stock strip or tube strip, is first treated to render the surface of the polyethylene uniformly receptive and retentive of coating solutions which will reduce its gas and volatile vapor transmission rates as well as reduce its water vapor transmission rate and impermeability to liquids, the said view also illustrating one possible procedure wherein, after such treatment, the polyethylene is printed, as by a multi-color printer, dried and rewound, whereupon it may be fed to a solution coater. It is to be understood that the treated film may be rewound and then passed to a solution coater or passed directly to a solution coater and coated before printing. After the solution coating has been applied and dried, the coated polyethylene film may be passed directly to the printer or may be rewound and then passed to the printer.

Figure 4 is a top elevation of the burner shown in Figure 2;

Figure 5 is a longitudinal section on the line 4—4 of Figure 4;

Figure 6 is a vertical section on the line 6—6 of Figure 4;

Figure 8 is a sectional detailed view of the support or rotating cylinder;

Figure 9 is an elevation showing the mounting of the burner whereby the same may be moved toward and from the support or rotating cylinder;

Figure 10 is a perspective view of a construction for adjustably moving the burner both toward and from and laterally back and forth with respect to the supporting or rotating cooling cylinder;

Figure 11 is a diagrammatic view showing the coating process with a reverse roll coater;

Figure 12 is a detailed view of a "kiss coater" wherein the rolls move in the same direction as the web to coat the same;

Figure 14:
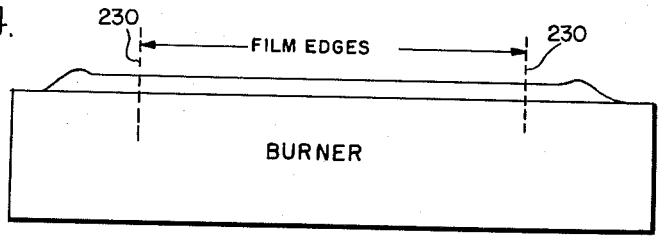
Figure 15:
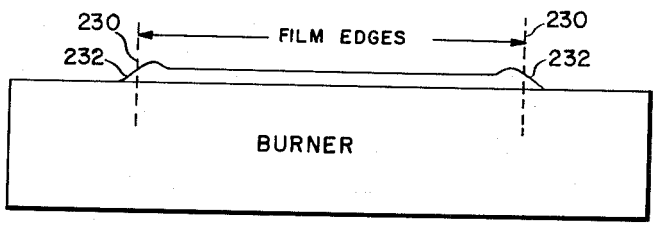
Figure 16:
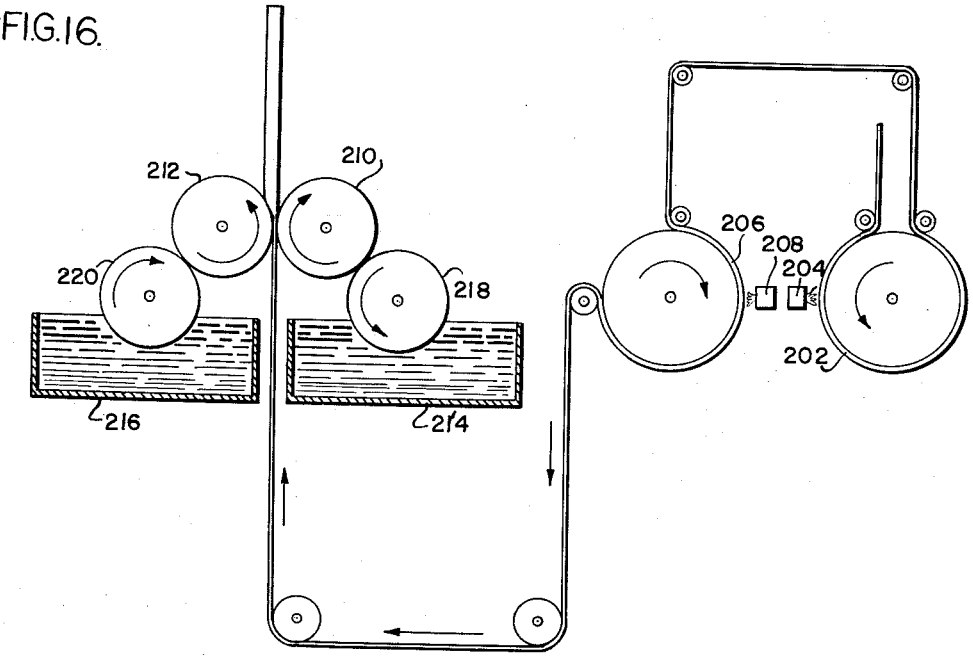

Figure 13 is a sectional view showing the polyethylene web provided on its surface with a continuous, co-extensive, flexible and integral film of a vinylidene chloride polymer, it being understood that the polyethylene may have a vinylidene chloride polymer coating on both surfaces which may be obtained by using the coater shown in Figures 12 or 16, or by passing the strip twice through the machine shown in Figure 11, or by disposing a pair of one surface-coating devices on opposite sides of the strip at spaced points;

Figure 14 is a diagrammatic view showing the flame improperly applied to a polyethylene film;

Figure 15 is a diagrammatic view showing the flame properly applied to a polyethylene film;

Figure 16 is a diagrammatic view showing flame treating both sides of the polyethylene, followed by simultaneously coating both sides with a vinylidene chloride polymer or copolymer.

In carrying out the invention, the numeral 10 indicates a roll of polyethylene, which may be either flat strip stock or tube stock. The same is positively fed from the roll 10 over suitable tension devices indicated as a whole at 11, and passes over a rotating drum 12. This drum is positively driven and is preferably made of a good heat conducting material, such as aluminum, and the temperature of the surface of the drum is maintained substantially constant and always below the fusing or melting point of the polyethylene. This can be accomplished in various ways as, for example, by circulating a cooling medium through the drum which may be either in liquid form as water, or ethylene glycol, or in gaseous form as air, the latter in conjunction with suitable fins.

Figure 1:
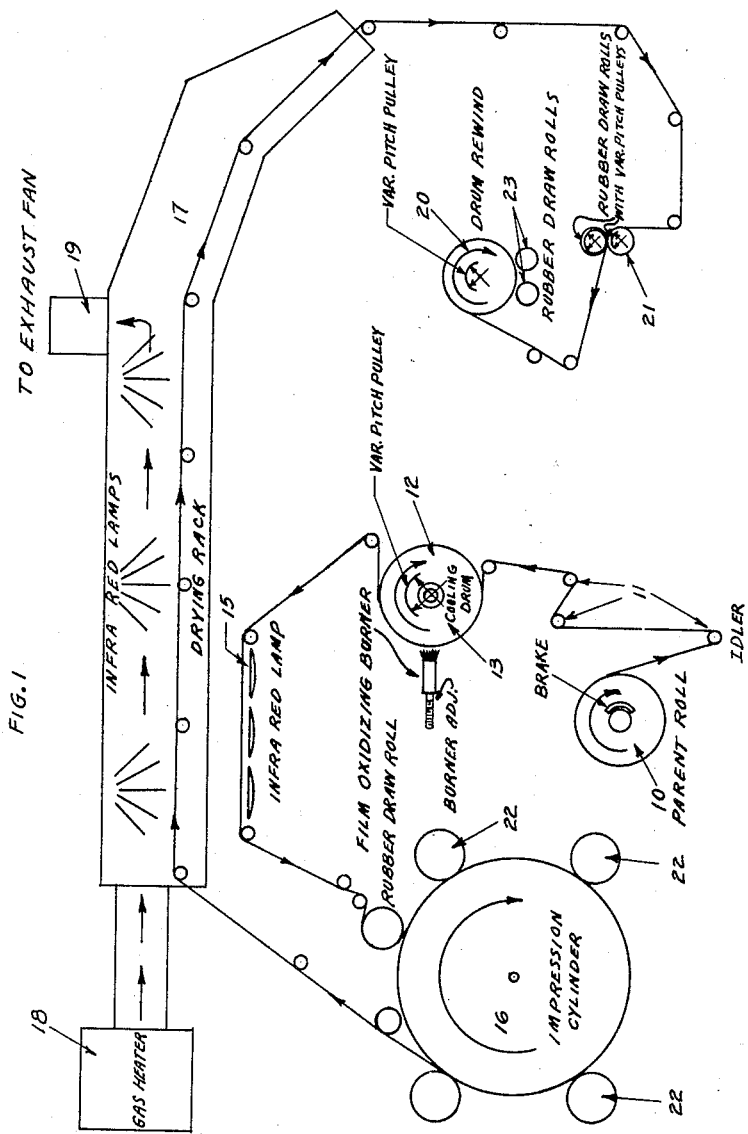

Referring to Figures 1 and 8, the support or rotating cylinder 12 is rotatably mounted in a yoke 35 having legs 36 carrying bearings 37 and 38. Extending from the cylinder at one side thereof and supported by the bearing 37 is a stub drive shaft 39 carrying a suitable split pulley 50 by which the cylinder 12 is rotated. At its other end, there is similarly connected to the cylinder a second shaft 40 which is tubular and rotating in the bearing 38, as shown, and through which extends an inlet pipe 41 connected to a liquid pump 42 for introducing cooling liquid to the interior of the cylinder from a supply tank 43. The liquid in the cylinder 12 overflows out of the cylinder through the circular opening 44 in the end wall thereof provided by the space between the inlet tube 41 and the inner wall of the tubular shaft 40, and travels through the space 45 between the two tubes to return to the supply tank 43, as shown at 46. The liquid is continuously pumped out of the supply tank 43 through the tube 41 and returned through the space between the tubes 40 and 41 back to the tank and is kept at a reduced temperature therein by means of cooling coils 47.

Referring to Figure 8, we find it is preferable that the surface temperature of the roll 12 be kept substantially constant, so that the flame treatment is substantially uniform and the high receptivity and retentivity, likewise, is substantially uniform throughout a roll of material being treated. Hence, for best results, care is taken to assure that the temperature of the cooling liquid which is circulated through the rotating drum 12 is maintained substantially constant and always below the melting point of the polyethylene, whereby the temperature of the surface of the drum 12 is maintained substantially constant and the drum will act to rapidly dissipate heat created by the burner 13 and preclude any appreciable through-heating of the strip or variation in the effect of the flame treatment.

Figure 3:
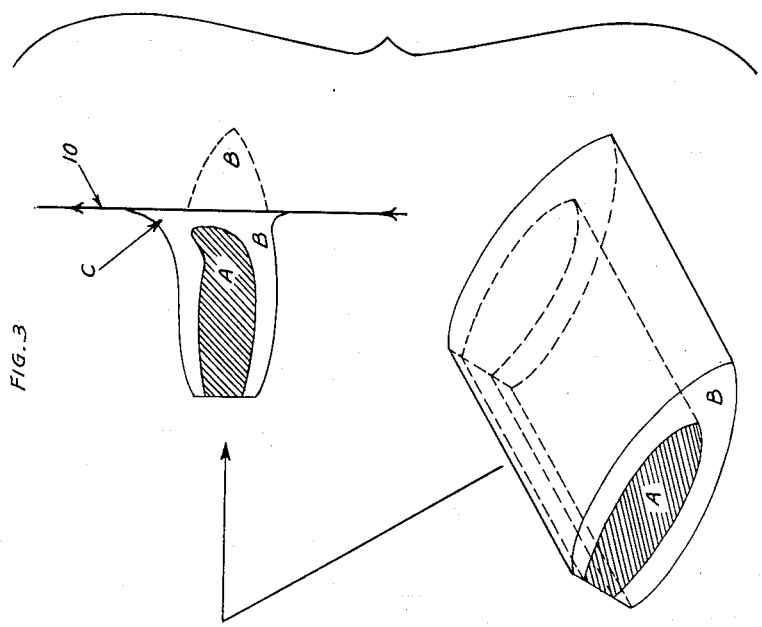
Figure 3 is a perspective view of the ribbon flame produced from the burner and showing the polyethylene stock passing slightly beyond the pale blue wedge area of the flame and being impinged upon by the outer high temperature oxidizing area of the flame in which the gas has been substantially completely combusted.

As the material passes over the rotating drum surface, it is subjected to direct contact with an oxidizing flame of the oxygen type produced by the burner 13. An oxidizing flame is, at all times, maintained, since it is found that a reducing flame in this invention does not produce suitable results. The relationship of the mixture of air and gas, e.g., natural gas, illuminating gas, acetylene gas, methane, propane, bottled gas, etc., is critical, so that at all times, there is projected upon the material moving over the drum a flame which is substantially devoid of uncombusted gas. Such a flame, as shown in Figure 3, has a light blue wedge *a* and an outer area *b* free of yellow color denoting complete combustion of the carbon, and it is this outer area *b* which impinges directly upon the surface of the polyethylene. The gas mixture may be composed of air and any suitable combustible gas, as indicated above, it being essential that the mixture contain, at all times, such an excess of oxygen as to assure an oxidizing flame substantially devoid of incompletely burned carbon, as indicated by the absence of a yellow flame. That is, the mixture provided is substantially devoid of the customary outer, yellow flame area observed where there is incomplete carburetion characteristic of a reducing flame in connection with the conventional Bunsen burner.

It is a characteristic of this invention that the flame (when such is employed), as directed upon the moving polyethylene web, impinges upon the same as a continuous flame disposed transversely of the moving web, as shown in Figures 1 and 3. Preferably, the flame is directed upon the moving web as a blast, i.e., the air portion of the mixture is supplied as compressed air which better enables the proportions of the gas-air mixture to be controlled and maintains constant the desired flame characteristics and shape. The air may be supplied in any number of different ways, as by means of a conventional Venturi system, or oxygen itself may be supplied to produce the gas mixture.

Figure 2:
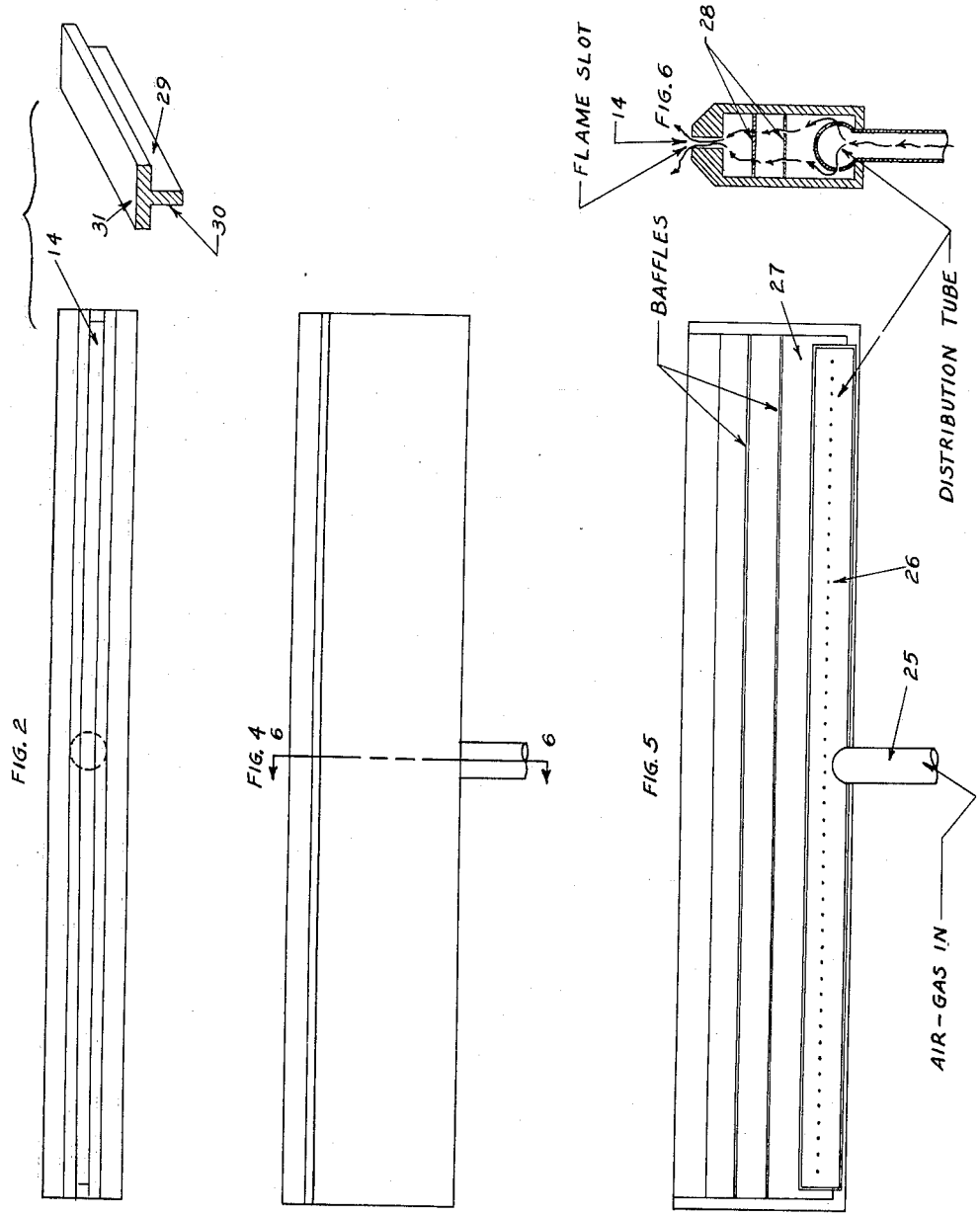
Figure 2 is a front view of the burner.

The continuous flame is produced by an orifice, as shown in Figures 1 and 2, in which the flame outlet is a continuous slot 14. The criticality of this feature can be readily demonstrated in that, where the flame is produced from a plurality of spaced burner openings, the action of the flame upon the moving web produces an uneven treatment, resulting in striped areas of varying coating or ink receptivity and retentiveness, representing areas of strong and weak adherence of the coating or printing and decoration to the polyethylene surface. The weakened areas of adherence are the first to either disintegrate or be abraded off. This we have now avoided by directing a continuous, flat, oxidizing flame in the form of a ribbon upon the moving web, so that the entire surface of the moving web is uniformly treated by the flame. While we prefer a simple continuous slot 14 as the burner opening to insure a thin, flat, continuous ribbon flame directed upon a moving web, a similar type of ribbon can be obtained, using a multiplicity of burner openings provided that these openings are close together and direct their respective flames so that they merge to produce a continuous, flat, ribbon flame. For instance, a singing flame or an oscillating flame, wherein the individual jets go into a resonant vibration and oscillate contrasted with jets which extend from the burner in a fixed pattern, like teeth from a comb, will give the desired uniform flame treatment. The critical feature, as will be apparent, is a treatment upon the surface of the moving web which is even throughout its area and is devoid of any spots or stripes which have not received a uniform treatment. As explained, if an uneven treatment is produced on the web, then the coating thereon will more readily abrade off or dissolve in the areas where the flame treatment has not been uniform.

Referring to Figures 2 to 6, the burner opening 14 is elongated as described and provides a continuous, uninterrupted opening. The gas mixture is supplied through the pipe 25 under pressure to conduit 26 which is perforated and discharges the mixture into the burner chamber 27. Disposed within the chamber is a plurality of perforated baffles 28 through which the gas passes to the continuous outlet 14. In order to reduce the longitudinal dimension of the flame from the outlet 14 or to locate the same with particularity, as regards the decoration or printing of polyethylene, T-shaped detachable plug members or shields 29 are provided, as shown in Figure 2. These may be of various lengths, as required. The body portion 30 frictionally fits within the slot 14 so as to close off the same to the extent desired. The body portion 30 satisfactorily plugs up the opening 14 to the limited extent required and the T portion 31 provides an additional assurance that there will be no escape of gas in amount to produce a fugitive flame in the area of the burner which is being shielded. Whenever the opening 14 is plugged by means of the T-shaped members 29, the mixture introduced through the pipe 25 is suitably varied, as is also the pressure, in order to maintain the desired flame characteristics, as described in connection with Figure 3.

Referring to Figure 9, the burner 13 is carried on a block 48 which is slidable over a bracket 49 which, in turn, is slidably mounted on the frame 58 of the apparatus adjacent the cylinder 12 to be more parallel to the axis of the cylinder 12 at right angles to the path of movement of the block 48. Extending rearwardly of the carriage block 48 is a micrometer screw 51 having threaded engagement with the block 48 and extending therethrough and through an upstanding ear 52 on the bracket 49, as shown. The screw 51 is provided at its outer end with a suitable operating handle 53 and by turning the handle 53, the carriage block 48 moves forward or backward with respect to the bracket 49 and the flame from the burner opening 14 is disposed toward and away from the rotating cylinder 12 over which the polyethylene strip is continuously passing.

Referring to Figure 10, it is sometimes desirable to not only move the burner 13 toward and away from the cylinder 12, as shown in Figure 9, but also laterally with respect to the cylinder 12, as where the film shifts toward one end or the other of the said cylinder as it travels thereover. For this purpose, the second bracket 49 is slidably mounted on the frame 58 by means of a transverse guide or track 55 engaging the underside of bracket 49 as at 56. This track extends at a right angle to the path of movement of the carriage block 49. The bracket 49 is positioned on the frame for transverse sliding movement with respect thereto and it is moved laterally of the cylinder 12 by a similar microscrew 51' which passes through the frame, as shown, and through a carriage block 57, depending from the bottom of the bracket 49, in threaded relation with the bracket, as shown. The microscrew 51' extends at right angles to the path of movement of the carriage block 48. In this manner, rotation of the handle 59 and microscrew 51' will adjustably move the bracket 49 laterally back and forth with respect to the cylinder 12 and the strip of polyethylene passing thereover and, of course, the rotation of the microscrew 51 by the handle 53 will move the carriage block 48 to adjustably position the burner 13 toward or away from the cylinder 12.

It is to be observed that the flame from the burner openings 14 is directed at substantially right angles to a vertical tangent of the cylinder 12 and convection currents, therefore, do not overheat the strip or the cylinder 12, as such currents will pass substantially vertically and not spread over the strip before or after flaming. The slight spread of the flame, as shown in Figure 3, is advantageous in assuring uniform contact of the flame with the web and has been shown somewhat exaggerated.

We have indicated above the thickness dimension of the continuous flame which we consider satisfactory for all practical purposes. It is recognized, however, that, using various types of combustible gas and burner orifices, it may be further desirable to use a burner which will produce a flame of greater thickness, e.g., an inch or more, so as to assure uniform treatment and uniform coating or ink receptivity and retentiveness of the coating or printing over the entire area of the polyethylene surface and a resulting uniform adherence which will assure that the coating or printing or decorating will be free from the objections of striping, blotching and streaking.

The thickness of the polyethylene film, which is treated in accordance with our above disclosure, may vary widely. For instance, film having a thickness as low as $5/10,000$ of an inch and as high as $1/8$ of an inch and higher can be satisfactorily treated by this invention, the only requirement being that the film be flexible enough and strong enough to travel as a continuous web through the apparatus. In this connection, paper or other material, having a coating of polyethylene thereon of less thickness even than 5/10,000 of an inch, has the polyethylene surface satisfactorily treated in accordance with the above process. The usual thickness of the polyethylene film used for wrappings and bags is about 1½ thousandths of an inch, and this is successfully run and coated upon by the process described in this application.

While we have referred above to carrying out the flame treatment as the strip is passing over a positively driven cylinder or drum, so that the flame is directed upon an arcuate portion of the moving strip, this is not strictly necessary, since the strip can be passed over a flat surface and the flame impinged thereon, if desired. The important consideration, of course, is to avoid any heating of the entire thickness of the strip above the melting point of the polyethylene and to maintain conditions whereby heat incident to the flame treatment is rapidly dissipated to preserve such a condition, as explained in connection with the rotating roll. In this connection, the ribbon flame may be directed upwardly at an angle upon the web as it travels on the rotating cylinder or on a flat surface, but this, likewise, is not essential.

The speed of the stock past the burner 13 may be as low as 50 feet per minute and in excess of 300 feet per minute, or more, namely, 600 feet or higher. Suitable adjustment of the flame from the burner 13 may be readily provided so that, at the slower speeds, the flame will be of smaller dimension, i.e., of less projected length from the burner, as where the mixture contains less gas and less air and is of lower temperature in its outer zone which impinges on the polyethylene surface. The temperature of the flame and its projected length from the burner will, of course, be accordingly increased as the speed of the polyethylene over the drum is increased. The thickness of the flame may vary from 1/32 of an inch up to ½ of an inch or more, e.g., 2 inches, it being critical, at all times, that the action of the flame avoid any softening or melting of the polyethylene surface. Therefore, regardless of the temperature of the flame, its contact with any portion of the moving web is always a fraction of a second.

The important considerations, as indicated above, are that the flame shall always be oxidizing, that it shall uniformly heat the moving, thin, flexible polyethylene web in the transverse area of the web in contact with the flame, as provided by the continuous flame from the burner 14 in Figure 2, that the contact of the flame with the moving web be always a fraction of a second, and that the temperature of the surface of the drum 12 shall always be substantially less than the temperature of the flame and below the fusing or melting point of the polyethylene. The contact of the flame with the moving web being always a fraction of a second, notwithstanding that the temperature of the flame impinging on the web is between 900° F. and 4000° F., or more, e.g., 5500° F. or higher, assures that there will be no substantial melting of the polyethylene surface by reason of the flame treatment, on the one hand, and further assures that what we believe takes place, namely, an oxidation of the polyethylene, is accomplished. That the success of the flame treatment is due to oxidative influences exerted uniformly on the surface of the polyethylene seems to be the best explanation for the new and unexpected results which have been obtained by this invention. For example, when, instead of using the flame treatment, the polyethylene web is heated below its melting point and traveled through an area of corona discharge, similar results are observed. If desired, additional ozone may be applied to the moving heated web slightly in advance of the corona discharge area or within the area, the ozone discharge nozzle having a continuous outlet and is disposed in close proximity to the surface of the moving web transversely thereof. The surrounding air may be suitably heated as by infra-red or hot wire heaters to facilitate the action of the ozone from both the corona discharge apparatus and the supply nozzle. Likewise, when the web is floated upon or immersed in a solution consisting of concentrated sulfuric acid and potassium or sodium dichromate in enough water to dissolve the same, i.e., saturated solution, at room temperature, a similar result is obtained. Also, when the polyethylene web is floated upon an aqueous acidic solution of an acid permanganate at a temperature from about 40° C. to 80° C., e.g., an aqueous solution of sodium or potassium permanganate and concentrated nitric acid, a similar effect is observed. In each of these alternate procedures, the oxidative influence is uniformly exerted upon the thin, flexible film of polyethylene to uniformly insure enhanced coat receptivity and retentiveness. In connection with the solutions described, higher temperature will speed up the treatment and lower temperatures may be used where time is not a serious factor.

In this connection, and as further indicating that a surface change has taken place under the environment of an oxidative influence of the oxygen type, which is uniformly exerted upon the polyethylene surface, it has been found that, whereas untreated polyethylene film can be heat-sealed in the conventional manner, the treated surfaces which have been subjected to the oxidative influence, will not form a satisfactory heat weld. Thus, where flat sheeting is being treated, one or both margins of the strip may be shielded from the oxidative influence by adjusting, for example, the width of the flame, so as to assure that the margin or margins which are subsequently to be used for forming a bag or tube with a heat-sealed weld, may be so formed into a strong lap joint, as customary in the manufacture of polyethylene bags and tubes. Referring to the burner 14, the elongated uninterrupted opening therein may be adjusted from either side to narrow the transverse width of the flame and locate the area of impingement of the flame upon the polyethylene surface to take care of the required area to be coated, as well as to shield a margin for sealing purposes, as above described.

We have referred above to acid oxidizing solutions and, as a specific example of the same, we employ concentrated, e.g., 95%, sulfuric acid in the proportion of one liter with 35 cc. of saturated technical potassium dichromate water solution. Alternatively, sodium dichromate solution can be used. The concentrated acid is preferable, because a weak acid rapidly loses its effect and does not act as rapidly. As indicated, room temperature is satisfactory for treating the polyethylene surface either on one side by floating, or on opposite sides by immersion in the bath, and it is desirable to keep the solution below 60° C. in order to avoid brownish discoloration. The solution-treated web is washed with tap water and is suitably dried by air-drying or vacuum or conventional dehumidifying means. This solution is preferred and is particularly useful in improving the coat receptivity and retentivity of commercial, chlorinated polyethylene film.

We have also successfully used sodium or potassium permanganate in a 35 cc. saturated solution in water and have also used concentrated nitric acid.

Aqua regia, namely, concentrated hydrochloric acid, 3 parts, and concentrated nitric acid, 1 part, has also been used.

In connection with the use of corona discharge, as indicated above, when the film is run close to the corona discharge points at room temperature, or slightly above room temperature, e.g., 80° F. to 85° F., a satisfactory treatment results.

Ozone alone may be used by passing the strip through a chamber containing the ozone and the strip or chamber, or both, may be heated to a temperature below the melting point of polyethylene, preferably, 175° F., but within the range of 160° F. to 200° F.

The preferred method of oxidation is with a flame.

In connection with the air-gas mixture supplied to the burner, as indicated, an air-gas blast is preferably used either with straight air carburetion, or forced, compressed air blast carburetion, or with controlled oxygen gas carburetion.

The web is removed from the cylinder 12 and, if necessary, dried in any suitable manner as by passing the same past a battery of infra-red lamps 15 in a drying zone. This drying is not essential but, usually, there results some water of condensation on the strip, particularly in humid weather and, as will be appreciated, it is essential to remove this prior to coating or printing. Thereafter, the strip either directly passes around a printing press 16, as shown, to produce single color or multi-color printing, including both a decorated design, as well as letter printing, in accordance with the desires of the purchaser, or is rewound and thereafter supplied to the coater or passed directly to the coater shown in Figures 11 and 12 and subsequently printed as described upon the vinylidene chloride polymer or other coating.

As explained above, the coating, as applied to the treated polyethylene surface, has marked resistance to boiling, freezing, and moisture condensation on the surface, as well as resistance to removal by fats and oils, and improved abrasion resistance. The treated polyethylene surface can be immediately printed or coated or the treated web can be rolled up and coated and printed at a later time, as desired. No special inks are required and many different types of coatings may be employed, as will be later set forth. In fact, envelopes made of the treated polyethylene in accordance with this invention have been stamped, using ordinary stamp-pad inks and postmark inks, and the same have been retained permanently and uniformly upon the treated surface of polyethylene.

An important feature of the invention is the fact that the essential characteristics of a polyethylene film are not altered when given the treatment described herein. The polyethylene film retains its transparency, flexibility, strength, durability, sterility and cleanliness, and is very desirable for packaging foodstuffs. The foregoing applies to films of varying thickness, as well as the relatively thick films which are employed in the manufacture of such articles as bottles, boxes and eyeglass cases.

An important test as to whether or not our treatment has been properly accomplished, is carried out by attempting to adhere face-to-face two treated areas by heat and pressure to form a customary heat weld. Failure to produce a heat weld in such cases indicates (1) that the treatment has been uniform, and (2) that the treated film may be coated upon with the assurance that permanent uniform adherence of the coating will be obtained over the entire treated areas.

There is available at the present time polyethylene film which has been surface-chlorinated. In some cases, there is obtained with this film fairly satisfactory adherence of coating solutions and printing inks but, in other cases, apparently due to variations in the chlorination treatment, the results are definitely objectionable. We have found that in all cases, if the film be given the flame treatment or a chemical treatment or Corona discharge treatment, as described herein, the surface of the chlorinated film is rendered uniformly coating-receptive and retentive and is commercially useful, all objections to the chlorinated film being thus overcome. This is accomplished by following the processes described above.

By "heat weld," as recited herein, we mean a true weld of two surfaces of polyethylene face-to-face together wherein, under the action of heat and pressure, the polyethylene of the opposed surfaces fuses and the fused surface portions completely merge into an integral bond.

Where refrigeration is used in the drum 12 to precool and postcool the thin, flexible web of polyethylene, a suitable coolant, such as ethylene glycol, at a temperature of 0° F. to 75° F., and preferably 45° F., is circulated through the drum.

In the operation shown in Figure 1, using flat polyethylene bag tubing, the strip passed over the drum 12 at a speed of about 200 feet per minute and the temperature of the $b$ zone of the flame which impinged upon the front face of the tube was about 3500° F., using compressed air to supply the air to the gas mixture. The pressure of the air may be from 1 to 20 pounds per square inch and, in the particular instance, was about 5 pounds per square inch and the gas pressure was about ¼ of a pound per square inch. With such a mixture applied at blast pressure, it is preferable to use a coolant in the rotating cylinder 12 and it is possible to operate at the strip speed of 200 feet per minute and even higher. The thickness of the flame was about ⅛ of an inch and the transverse dimension of the flame was 7½ inches as impinged upon a flat bag tubing having a width of 8 inches, so that a narrow margin of about ¼ of an inch was untreated at each edge of the front side of the bag. In the particular instance where the flat tubing passed the flame traveling at 200 feet per minute, the time of contact of the flame with any area of the surface of the tubing was in the neighborhood of $\frac{1}{320}$ of a second. Notwithstanding this unbelievably small time of contact, due to the fact that the zone $b$, impinging upon the polyethylene surface, was continuous and uninterrupted and of uniform temperature through its transverse dimension, the entire area of the web between the untreated narrow margins above-mentioned was observed by experimental test to have uniform ink receptivity and retentiveness. In other words, by providing for a uniform flame treatment with a continuous flame, not only can the strip be carried through the apparatus at high speed, but with the assurance that the strip will be uniformly treated to obtain uniform adherence of the coating or printing or decoration throughout and the strip will not be subject to the formation of stripes, blotches and streaks, due to non-uniform adherence.

While we have described above the treatment of flat seamless polyethylene tubing, a similar procedure is followed in the manufacture of gusseted seamless polyethylene tubing, as well as flat strip stock, either for wrapping purposes itself, or for formation into bags, tubes or other similar containers.

In the example above-indicated, the distance of the burner opening 14 from the web on the rotating roll 12 was about ⅜ of an inch, and the impingement of the zone $b$ of the flame just in front of the pale-blue area $a$ was controlled by moving the burner toward the drum to obtain this precise flame location and impingement. Where a more powerful flame blast is utilized, the burner can be moved back a distance to assure that the web will be, likewise, impinged upon by the flame area in front of the pale-blue area $a$, and where the pressure is reduced, the burner can be moved forward to a greater extent to obtain the same maximum results, namely, impingement of the flame area slightly beyond the pale-blue wedge area upon the moving web. The adjustment just described, whereby the burner is moved toward and from the drum 12, is preferably accomplished by a microscrew, but other suitable means may be utilized.

The adjustment of the position of the burner with respect to the rotating drum 12 is carried out according to the composition of the gas mixture and temperature of the flame, the character of the polyethylene surface, which sometimes varies with different suppliers, and the speed of travel of the web through the process, so that very fine adjustments can always be accomplished to assure that the web will be subjected to uniform oxidative influences and the treated surface of the polyethylene will have uniform coat receptivity and retentivity throughout the area in which the continuous ribbon flame impinges upon it.

Almost any of the usual printing and decorating inks can be employed in carrying out the process, and we have used, in connection with the flat polyethylene tubing and flat strip stock, the usual commercial inks provided by International Printing Ink Company, and recommended for the printing of polyethylene.

Such inks are as follows, and are dissolved or suspended in organic solvents, for example, alcohol:

Black NOX 7362
Red NOX 6979
Green NOX 8374
Blue NOX 6981

In addition, we have also used Bensing & Deeney inks, which are described as follows (in alcohol):

Yellow—9 YR—8/13 (Y–1245)
Brown—1 YR—4/4 (BN–1235)
Blue—8 PB—4/15 (B–1583)
Red—R5—4/13 (R–1626)
Green—2G—6/10 (G–1417)

While we have indicated printing and decoration only upon one surface, namely, the front surface, it is to be understood that both sides of the bag may be printed or decorated upon in the manner above-described. This may be accomplished by running the polyethylene film through the machine twice but, it is also accomplished by employing two of the rotating drums 12 in spaced positions and associated burners so as to flame-treat one side of the web and, thereafter, when the web is suitably cooled, if necessary, treating the opposite side and then carrying it through the printing press in the same manner, i.e., printing one surface of the web with one press, and then carrying it to an adjacent press and printing the other side. In this manner, the flat tubing or flat strip of polyethylene film may be printed on both sides with one pass through the process.

In Figure 16, there is illustrated a method whereby first one side of the polyethylene tubing (or film) is flame-treated at 202 by burner 204, and then the other side is flame-treated at 206 by burner 208. The polyethylene film then passes through rollers 210 and 212, where both sides of the polyethylene film receive a coating of a polyvinylidene chloride solution which is transferred from the tanks 214 and 216 by rollers 218 and 220 to rollers 210 and 212.

In making bags having gussets from flat strip stock, where it is desired to coat or print and decorate completely about each bag, i.e., on the back and front and in each of the gusset areas, a serious problem arises with respect to the heat sealing of the opposed portions of each gusset at the bottom of the bag. That is, the flame treatment so changes the character of the surface of the polyethylene, as indicated above, that customary heat sealing is precluded and each gusset would remain open at the bottom of the bag to present an objectionable appearance.

This is overcome in several ways. For instance, there may be provided a continuous conveyor moving vertically and at the same speed as the strip moves over the drum 12. This conveyor will carry a shield or spaced shields and in its travel, will position the shield or shields between the burner and the drum 12 at predetermined intervals. Suitable cooling means are associated with the conveyor to keep the shutter from overheating. Thus, as with the previous method, the strip is provided with spaced untreated transverse areas defining the bottom portions of the bags, i.e., areas which have been prevented from being flame-treated by the interposition of a shield which prevents the flame from impinging on the strip at predetermined times in its travel.

In each of the foregoing methods, also, the flame 14 is so controlled as to leave small marginal areas at each longitudinal edge of the strip untreated, whereby, when the strip is folded upon itself to form a flat tube, having the customary lap seam, the marginal areas defining the lap joint will readily heat seal, having been untreated by the flame.

Figure 7:
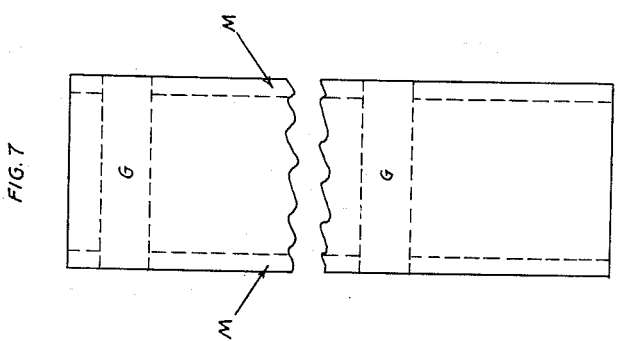
Figure 7 is a top view of a flat strip of polyethylene in which the side edge margins *m* have been untreated to facilitate forming a lap joint by heat sealing and the transverse areas *g* have been left untreated to assure that the strip can be used for making gusset bags and the gusset portions at the bottom of the bags can be heat-sealed.

In Figure 7, there is illustrated a flat strip or sheeting of polyethylene. This strip may subsequently, be folded into a tube and formed with the usual overlap joint, for example, at the back of a bag. By limiting the extent of the flame with respect to the sheet, so that the margins $m$ thereof are not flame-treated, these margins can be overlapped and heat-sealed in the usual manner. Also, in connection with Figure 7, we have shown by transverse dotted lines, areas $g$. These areas have been shielded in the manner above-described to assure that, when the flat strip or sheeting is subsequently made up into a gusset-type of bag or tube, it will be possible to seal the opposed portions of each gusset by the usual heat-sealing procedure, at the bottom cross seal of the bags or tubes.

Referring to Figure 3, the shape of the elongated continuous ribbon flame from the burner 14 is illustrated showing the inner area $a$ of incompletely burned gas and the outer area $b$ in which the carbon has been substantially completely burned and which is devoid of any yellow color, indicating the absence of uncombusted gas. Also, in Figure 3, we have illustrated the manner in which the flame just described impinges upon the surface of the sheet or web of polyethylene 10, the same passing through the flame beyond the wedge $a$ and being impinged upon by the area of substantially completely combusted gas of the flame. It is to be noted that the flame spreads upwardly, as shown at $c$ in the direction of rotation of the drum 12. While we have shown the strip 10 as being quite close to the end of the wedge $a$, it may pass through the outer area $b$ of the flame at various positions, but, at no time, should it pass through any of the area of uncombusted gas indicated at $a$.

In connection with the several processes described above for uniformly subjecting a continuously moving, flexible, flat strip of polyethylene tubing of the plain and gusseted types or flat sheet stock to uniform oxidative influences, it is to be understood that the treatment of the surface of the polyethylene with oxidizing solutions, as described, may precede the flame treatment or take place after the flame treatment, and in some cases, may be used both before and after the treatment or between at least two flame treatments. Likewise, the treatment of the surface of the polyethylene with corona discharge may be accomplished in the same manner with the flame treatment. Also, in some cases, the surface of the polyethylene will be subjected to the treatment with oxidizing solutions and corona discharge and, in such cases, while it is preferable to first treat with a particular oxidizing solution, this can be accomplished after the corona discharge treatment and both before and after the corona discharge treatment or the solution treatment may be interposed between two corona discharge treatments. There are some cases where all three treatments, namely, the flame treatment, the treatment with an oxidizing solution and the corona discharge treatment are all utilized.

A feature of this invention, which is of particular significance, is the fact that once the polyethylene surface has been subjected to uniform oxidative influences, as described above, its uniform ink receptivity and retentiveness frequently are retained in substantially permanent condition over long periods of time. For instance, we have stored polyethylene treated as described in this application for better than six months and then printed and decorated the so-treated polyethylene and found that the results were as satisfactory as when the treated polyethylene was immediately decorated and printed upon. While this is true, insofar as ink receptivity is concerned if it is desired to further coat the treated surface with or without printing, it is important that the coating with the solution of a vinylidene chloride resin be applied as soon as possible after the oxidative influence treatment.

The illustration of the invention above-described shows a single oxidative treatment for one or both sides of the strip. In some cases, where the inks or coatings possess peculiar characteristics or the polyethylene surface requires the flame treatment, the corona discharge treatment, or the treatment with an oxidizing solution and combinations of the several treatments, as described above, may be repeated on the same surface of the strip on one or both sides thereof and the treating means are disposed at spaced points in advance of the printing press, in accordance with Figure 1.

We have referred above to treating the strip while travelling at a speed of 300 feet or more per minute, and by that we mean, up to 600 feet a minute, and in referring to flame temperatures of 4000° F. and above, we mean as high as 5500° F., it being possible by moving the burner 13 toward and away from the drum or support 12, by varying the air and gas pressure, and the proportion of air to gas, as well as the particular gas used in the combustible mixture, to obtain satisfactory results, namely, uniformly and completely treating the polyethylene surface to assure uniform and permanent adherence of printing and coating thereto. In this connection, the treatment of the surface of the polyethylene to oxidative influences of the oxygen type may be definitely described as being satisfactorily accomplished when treated areas of the polyethylene can no longer be adhered together by application of heat and pressure in the customary manner to form a heat weld. As well understood, polyethylene can be heat-sealed, i.e., marginal surface areas of polyethylene are adhered together in commercial bag manufacture by heat and pressure to form what is described, in the case of a lap joint, as a heat weld. In the present invention, as explained above, areas treated as described herein, can no longer be fused by a heat weld. This is a critical test of whether or not the polyethylene is uniformly and successfully treated to impart uniform ink receptivity and retentivity.

Referring to Figure 1, the parent or feed roll 10 is provided with suitable braking means 10' including a brake drum and cooperating brake shoe whereby, if the tension created by the passage of strip through the apparatus goes beyond a predetermined limit, the dancer bar 11 is pulled downwardly by the excess tension of the film and releases the brake so that the rate of feed may be increased and, when the excess tension is overcome, the dancer bar returns to the normal position shown and the brake is again applied.

The pulley 50 on the stub shaft 39, shown in Figure 8, is of the split type, whereby its diameter may be increased or decreased to increase or decrease the peripheral speed of the drum 12. This is desirable to compensate for any stretching which may occur in the web between the feed roll 10 and the printing press drum 16, whereby tension upon the web is reduced to a minimum and, at the same time, objectionable slack is avoided. The press roll 16 operates at a fixed speed.

The draw rolls 21 are operated by a split pulley similar to the pulley 50, whereby their speed may be increased or decreased to assure that the web is kept under constant desired tension to take care, either of excess tension created by shrinkage or slack created by expansion of the web during its travel through the drying tunnel 17. This is important, because shrinkage or expansion of the web in the drying tunnel 17 may cause the web to move faster or slower with respect to the press cylinder 16 whereby, in multi-color printing, there would occur an objectionable lack of registry in printing. The rewind drum 20, likewise, is provided with a split pulley so as to rotate faster or slower, as required, in accordance with the delivery of the web from the draw rolls 21 thereto. The various adjustments above-described in connection with the feed roll 10, the rotating cylinder 12, the draw rolls 21 and the rewind roll 20 enables the strip to be passed through the machine and maintained always in a flat condition, particularly, and substantially devoid of excess tension or slack created either by shrinkage or expansion of the film as it passes through the apparatus. The relationship of the draw rolls 21 and the rewind drum 20 involves a particular problem in that rewind roll 20 must be adjustable to assure there will be no excess tension created on the web between it and the draw rolls 21 which would cause folding over on the rewind roll or undue slack between the draw rolls 21 and the rewind roll 20 which would produce weaving and irregularly wound winding of the strip. The draw rolls 21 are adjustable to take care of the expansion or contraction of the web during its travel through the drying tunnel 17.

While we have referred above for convenient illustration to first printing on the treated surface of the polyethylene and then coating with a vinylidene chloride resin, it is to be understood that the treated polyethylene can be first coated with a vinylidene chloride polymer or copolymer and thereafter printed on the vinylidene chloride polymer film.

The strip, after it has been dried in the zone 15, may be either rewound and then passed to the coater, or it may be passed directly to the coater and in either instance, after the coating with a vinylidene chloride polymer, the coated strip may be subjected to printing and decoration. Reference is had to Figures 11 and 12, showing coaters either or both of which may be used in carrying out this invention. The coater illustrated in Figure 11 is a conventional reverse roll coater, i.e., the coating roll rotates in a direction opposite the direction of movement of the web 10, the web moving in the direction of the arrows. The coating roll picks up the solution coating from the nip reservoir, as shown, and applies the coating to the travelling web. If it is desired, a so-called conventional "kiss-coater" may be employed, as shown in Figures 12 and 16, and we have shown this coater as provided with means for coating both sides of the strip simultaneously, the coating rolls in this device rotating in the same direction as the direction of movement of the web 10. The coating rolls apply the coating solution from the nip reservoir to the travelling web, and it is to be understood that the reverse coater of Figure 11 may be modified to also coat both surfaces of the web.

Any other conventional methods of coating, such as dip, knife, cast, brush, air-brush, spray, print, extrude and strip may be used, but the methods just referred to are preferred.

The vinylidene chloride resin solution in the coating reservoirs of Figures 11 and 12 may be obtained as a solution or may be produced by dissolving vinylidene chloride resin powder in a suitable solvent, such as methyl ethyl ketone or other available volatile solvent, such as tetrahydrofuran, cyclohexanone, isophorone, mesityl oxide. Such solvents may be mixed, or may be replaced in part by a number of recognized diluents, such as acetone, methyl isobutyl ketone, methyl-n-amyl ketone, ethyl acetate, butyl acetate, amyl acetate, nitromethane, nitroethane, 2-nitropropane, toluene, xylene, methanol, isopropyl alcohol, Cellosolve, ethylene dichloride, trichlorethylene, propylene oxide and dioxane. The concentration of the vinylidene chloride polymer solution varies from about 10% or less to 20% or more of the polymer by weight, about 15% being especially useful. The coating is preferably carried out at room temperature, using a Saran resin described as F-120 Saran, 200 centipoise viscosity type, Dow Chemical Company. This Saran resin, as stated, is a copolymerization product or vinylidene chloride and acrylonitrile. In some cases, the temperature of the coating solution may be slightly above room temperature, but, in any case, should not be high enough to cause any appreciable volatilization of the solvent, since this would objectionably thicken the solution.

The preferred vinylidene chloride resin coating solution includes by weight 15% Saran F-120, 200 centipoises (a vinylidene chloride-acrylonitrile copolymer containing a preponderant amount of vinylidene chloride), 63% acetone and 22% methyl ethyl ketone. It has been found that, by replacing about ¾ of the conventional methyl ethyl ketone solvent by acetone, as in the above formulation, odor problems in the coated film are avoided. The acetone permeates polyethylene to a much lesser degree than does the methyl ethyl ketone. The odor of the 75% acetone-25% methyl ethyl ketone mixture is far less offensive and is easier to remove than when methyl ethyl ketone is the entire solvent. Since the vinylidene chloride resin coating, as dried on the exterior of the polyethylene film, is substantially impervious to gases and vapors, it is imperative to keep the amount of solvent transferred to the inside of the tubing to a minimum. In some cases, ethyl alcohol or methyl alcohol can replace the acetone to prevent odor trapping in the tubing.

While it is possible to use from 5 to 100% of methyl ethyl ketone solvent mixture, the use of 100% methyl ethyl ketone is not desirable, as contrary to acetone, it swells the polyethylene and tends to weaken it. Furthermore, it imparts a fruity odor as previously set forth and it is difficult to remove this. Enough methyl ethyl ketone should be employed to keep the vinylidene chloride polymer in solution and as previously stated at present a 3 to 1 acetone to methyl ethyl ketone ratio is preferred.

It is essential to remove the last trace of solvent to get permanent adhesion of the vinylidene chloride polymer to the polyethylene and to obtain a uniform coating. The residual solvent should be less than 1% and for outstanding results should be 0.1% or less. The coating of vinylidene chloride polymer blends into the polyethylene so as to form an integrated product and to the naked eye there appears to be only a single layer, so that it is impossible to tell by looking at the polyethylene that it has received a coating of the vinylidene chloride polymer.

For best adhesion, the coating with the vinylidene chloride polymer solution should be done as soon as possible after the oxidizing treatment, e.g., 10 seconds or less, 5 seconds giving quite good results.

When printing is employed, it is advantageous to oxidize the polyethylene, as by flame treatment, then print, then again oxidize, and then to coat with the solution of vinylidene chloride polymer not only because this procedure enables the vinylidene chloride polymer to stick better to the ink and to form a protective coating therefor, but also because this procedure improves the adhesion of the vinylidene chloride polymer throughout, i.e., to the polyethylene as well as to the ink. Copolymerizable materials preferably in minor amounts can be employed, e.g., vinylidene chloride-vinyl chloride copolymer (85:15 mol ratio). Unless otherwise indicated, the term "vinylidene chloride polymer" in the present specification and claims is intended to include both homopolymers and copolymers.

There is preferably disposed over each reservoir of the coating machine shown in Figures 11 and 12 a suitable removable hood 102 which may or may not have a conduit (not shown) for collecting and carrying off any volatiles. The coated polyethylene, as it issues from the coater, may pass directly to and through a drying hood or tunnel 104, or there may be a short gap or open space between the coating machine and tunnel 104, in which the coated polyethylene film is exposed to the air and also to infra-red or wire heaters which will preclude any fogging or blushing of the treated film. Preferably, this gap is bridged by a removable hood 103 which encloses the heaters, as shown, and has a top and sides, but may be open or closed at the bottom, if desired. Volatiles which collect in the hood 103 are removed through tunnel 104 by means of exhaust fan 105. We have obtained, as stated above, a polyvinylidene chloride film which is more transparent than the original polyethylene film and, sometimes, because of variations in the polyvinylidene chloride or polyethylene compositions, either the air gap treatment with heaters or the treatment with the hood 103 are used to assure the desired improvement in transparency. In the drying tunnel 104, there are disposed suitable drying means, such as infra-red lamps or heaters, as shown, and a current of air is circulated through the tunnel by means of the blower fan 105 which removes volatiles to a suitable conduit.

The temperature within the drying tunnel is controlled in accordance with the speed of the strip through the tunnel and the thickness of the applied coating and the solvent used. Ordinarily, the coating is of extreme thinness, namely, from about $1/10,000$ of an inch or less to $5/10,000$ of an inch or more, and we have found coatings of about $2/10,000$ of an inch to be satisfactory. Of course, thicker coatings may be used but, ordinarily, will not be required, since the gas and volatile vapor impedance obtained by coatings of the dimension just referred to are deemed adequate.

The strip coated on one or both sides may be rewound on the rewind drum 20 and, subsequently, printed or decorated in the printer 16, or after drying, it may be passed directly from the tunnel 104 to the printer 16.

As will be appreciated, in the case of flat tubing strip, the extreme edge folds of a flat tubing may not be coated by the aforesaid procedure but such folds constitute such a small area of the total area of the envelope that their lack of gas proofness is negligible, i.e., has been found to be inconsequential with bags or envelopes of the customary commercial sizes.

In connection with the integral vinylidene chloride polymer film produced by the procedure above-described, it is to be understood that the solution may be modified in accordance with recognized vinylidene chloride polymer technology to either impart stiffness or flexibility in varying degrees to the finished coating or to reduce blocking in the rewind but, in all cases, the integral co-extensive vinylidene chloride polymer film is sufficiently flexible and so uniformly adhered to the polyethylene base throughout the surface area thereof, that there is no peeling or loosening, and the gas proofness of the wrapping or bag or envelope is substantially permanently maintained.

Sometimes, we have found it preferable to print the bags or decorate them after the vinylidene chloride polymer coating has been applied and dried, since there is less danger of the vinylidene chloride polymer solution attacking the inks. In some cases, of course, the inks for printing and decorating may be applied to the treated polyethylene surface and, thereafter, the vinylidene chloride polymer coating applied and, in those cases, the overlying vinylidene chloride polymer coating will produce an added protective effect upon the printing or decoration.

An important feature of the present invention is the remarkable uniform receptiveness of the polyethylene to the vinylidene chloride polymer solution and the even more remarkable substantially permanent, uniform adherence of the vinylidene chloride polymer to the polyethylene surface over the entire treated area. Not only this, but the vinylidene chloride polymer uniformly coats the polyethylene surface in the form of a continuous film which is integral with the polyethylene surface and, there are no broken areas or uncoated areas or areas of weak adherence or of uneven thickness of vinylidene chloride polymer coating. This is a new and unexpected advantage which becomes all the more valuable because the vinylidene chloride polymer gas and vapor impedance barrier persists when the envelope is flexed in all directions and when it is subjected to high temperatures or freezing, or abrasion, as well as solvents, greases and oils and other conditions which a satisfactory bag necessarily encounters in actual commercial use in the food, chemical, drug and other process industries. In other words, uniform coating and uniform adherence over the entire treated surface of the polyethylene container of gas proof and otherwise resistant substantially integral film of Saran, as described, provides a long-wanted commercial item.

We have observed some unusual phenomena in connection with this invention. For instance, when a package containing moisture was enclosed in a sealed envelope of untreated polyethylene, it was noticed, after about sixty days, that the polyethylene envelope puffed. We attribute this to two things, first, the relative humidity within the bag was greater than the relative humidity externally of the bag and there was competition between the water vapor within the bag and air molecules within the bag to diffuse through the polyethylene to the outside. The presence of the water vapor molecules acted to retard such diffusion on the part of the air, since the moisture vapor transfer rate for polyethylene film is relatively low, but it was still possible for air from the outside to diffuse through the polyethylene film and into the bag, so that both of the circumstances related contributed to produce a puffing of the bag, because of a positive pressure created in the bag.

On the other hand, when the same material was packaged in an envelope of the vinylidene chloride polymer coated polyethylene, as above-described, no positive pressure was built up within the envelope during the same time interval and this is explained by the fact that it was as difficult for the air on the outside to get into the inside of the envelope as it was for any air or water vapor on the inside of the package to escape, thus, effectively preventing gaseous dialysis from taking place. This test shows that, whereas polyethylene is a semi-permeable membrane for water vapor, and a relatively more permeable membrane for air and other gas, it has now been rendered by our treatment relatively impermeable to air and other gases, as well as water vapor.

Another observation which we have made is that the vinylidene chloride polymer coated film produced as above described, inhibits activity of molds, such as bread mold, or the growth of aerobic bacteria. It does not entirely prevent the activity of molds and the growth of bacteria, but the retarding effect is of great significance. In addition, we have observed that the vinylidene chloride polymer coated film greatly lengthens the time required for oils or greases, or oil, or fat vapors to pass through the polyethylene in appreciable amounts, i.e., bags, for example, containing cocoanut oil or buttered popcorn or potato chips, and tested for well beyond ordinary commercial periods were unaffected by greases or oils or oil or fat vapors which had been a common objection with ordinary polyethylene bags. Again, we observed that sealed bags of the vinylidene chloride polymer coated polyethylene will permit ready evacuation and hold a vacuum for a commercially feasible time period which, of course, is not true with polyethylene bags.

It is known that polyethylene from different suppliers and sometimes even from the same suppliers, has much stretch or tendency to shrink, and we have found that where these effects develop, the integral flexible co-extensive vinylidene chloride polymer film remains unaffected, i.e., it does not peel or loosen from the polyethylene base, so that the integral structure is maintained in the use of the bags or sheeting.

While we prefer a drying tunnel 104, as above described, it may be desirable, in some cases, to use conventional festooning or other drying, above or in addition to the tunnel, as where the polyethylene is vinylidene chloride polymer coated on one or both sides.

Referring to the burner 13, and the flame opening 14 thereof, the width of this opening, in some cases, may be increased to produce a continuous ribbon flame having a thickness of as much as two inches, due to the fact that high speeds can be employed in flame treating and for coating which are sometimes not possible with complicated multi-color printing where a registration is essential and where any stretching or shrinking would be detrimental to the printing or decoration.

There is available commercially polyethylene film which has been chlorinated and, whereas vinylidene chloride polymer cannot be satisfactorily coated upon the surface of such film, we find that, when this chlorinated film is treated in accordance with the present invention, namely, subjected to oxidative influences of the oxygen type, and then coated with vinylidene chloride polymer solution, it is rendered uniformly receptive and uniformly retentive of the polymer and a uniformly and permanently adhered vinylidene chloride polymer coating is obtained.

Referring to the oxidizing treatment, using the sulfuric acid-sodium or potassium dichromate solution mentioned above, the polyethylene film treated with such solution and, thereafter, vinylidene chloride polymer coated, constitutes a desirable process of this invention. Also, this solution treatment may be combined with the flame treatment, being used either before or after the flame treatment to give excellent results when the vinylidene chloride polymer coating is applied to the treated film. Furthermore, the acid dichromate solution treatment enables the chlorinated polyethylene film to be satisfactorily coated with vinylidene chloride polymer and also, when this solution treatment is combined with flame treatment, and then the polyethylene coated with vinylidene chloride polymer solution, the results are, likewise, satisfactory.

In all cases, a co-extensive integral coating of vinylidene chloride polymer is formed on the polyethylene which has the desired resistance and flexibility and is free from separation or peeling or flaking off, so that the resultant vinylidene chloride polymer coated polyethylene is ideal for packaging under the severe requirements of a gas proof package, as well as a water and moisture proof package.

Likewise, when chlorinated film is printed or decorated, the printing or decoration is not satisfactorily adherent in some cases. On the other hand, after the chlorinated film has been oxidatively treated in accordance with this invention, printed, again given an oxidative treatment and then coated with a vinylidene chloride polymer as described, the printing and decoration are permanently and uniformly adhered to the chlorinated film surface.

One of the circumstances which we have observed is, that whereas a vinylidene chloride polymer film in itself has nowhere near the shock resistance or tear strength of a polyethylene film, particularly at the sealed areas, when the vinylidene chloride polymer is coated upon a polyethylene film, as above-described, the integral gas protected web exhibits more nearly the shock resistance and tear strength of the polyethylene and these objections to vinylidene chloride polymer as a packaging film are overcome.

We have also found that, when polyethylene is treated by subjecting it to oxidative influences of the oxygen type, as above described, it becomes highly receptive and retentive of adhesives. Water-soluble adhesives and coatings, such as casein, starch, soya protein, glues, shellac, natural resins, and synthetics, such as polyvinyl alcohol, methyl cellulose, carboxymethyl, hydroxymethyl cellulose, etc., may be coated directly and partly on the treated polyethylene surface and dried as above-described. Such coatings may be later water-activated for use as bonding agents or adhesives. For example, a coating may be placed only on the edge area of a treated polyethylene film, and then subsequently be employed as a water-activated sealing flap of a wrap or envelope for use in holding the said sealing flap to another area of treated polyethylene film.

In this connection, not only water-sensitive adhesives, such as conventional animal and vegetable glues, etc., but various resinous, synthetic resinous and rubber adhesives may be coated upon the treated polyethylene surface and permanently adhered thereto in the same manner as the other solutions described above. For example, the well-known pressure-sensitive adhesive compositions may be coated upon the treated polyethylene surface with very satisfactory results, and, in fact, any of the customarily available commercial adhesives can be coated upon the treated surface of the polyethylene either as solutions, hot melts, etc., or by spraying, brushing, as described above, and permanently and uniformly adhered to the polyethylene base.

In addition to being highly receptive and retentive with respect to water-sensitive and pressure-sensitive adhesives, the treated polyethylene surface is highly receptive and retentive of heat-sensitive adhesives, for example, polyvinyl acetate, vinyl resin latex, i.e., polyvinyl chloride latex, wax compounds, and rubber base adhesives, all of which are commercially well known and available, and various others of the heat-sensitive type. Such adhesives can be applied to the treated polyethylene.

It is sometimes advantageous to coat the treated web with heat-sensitive adhesives since, under these circumstances, it will not be necessary to shield the transverse areas of the web, as shown at $g$ in Figure 7. Instead, an additional inking roll can be added to the printing press 16 to apply a transverse film of such heat-sensitive adhesives so that, in the manufacture of gusset bags, the opposed surfaces of each gusset at the bottom of the bag can be readily heat-sealed at the time the bottom transverse seal is made.

In coating the treated polyethylene with vinylidene chloride polymer and referring to Figure 7, the marginal areas $m$ will be left untreated and uncoated when coating flat stock strip for making back seam flat stock tubes or bags. Likewise, for making gusset bags, the transverse areas $g$ will be left untreated and uncoated. The transverse areas $g$ can be treated and then coated with an adhesive, as described above.

We have referred above to a test concerning the oxidative treatment and have pointed out that satisfactorily adhered coating and printing is obtained when the polyethylene surface has been subjected to oxidative influences of the oxygen type until treated surfaces, brought face-to-face together and subjected to customary heat and pressure, will not form a heat weld. A more severe test of this same character is represented by a treatment until a treated and an untreated surface of the polyethylene will not form a heat weld under heat and pressure. An even more severe test consists of applying a strip of fresh Scotch cellophane tape, such as No. 600 (Minnesota Mining & Mfg. Company), to the surface of the coated are and then quickly giving the cellophane tape a sharp pull way from the coating surface. If none of the coating or printing comes off of the treated polyethylene, it can then be accepted that the treatment under oxidative influences of the oxygen type has been conducted satisfactorily. From the foregoing, it will be understood that the polyethylene surface must be given at least a treatment to the extent that the treated surfaces, before coating, when brought face-to-face and subjected to customary heat and pressure, will not form a heat weld.

Referring to Figure 1, from the printing press, the coated or uncoated strip, as the case may be, is carried through a drying tunnel 17, preferably containing infrared lamps or heaters, to dry the printing. In addition, hot air is passed through the tunnel 17 to accelerate the drying and remove solvents and other volatiles, the air heater being indicated at 18 and the air and volatiles being extracted by a suitable exhaust fan 19. Thereafter, from the drying tunnel 17 the strip is rewound on the positively driven roller 20 when the printing or decoration has been applied over the coating, so that the roll is then available for manufacture into suitable envelopes, bags, decorative sheeting and other products. If further coating is necessary, the strip from the dryer may be rewound or directly passed to one of the coaters shown in Figures 11 and 12.

In certain instances, the vapor transfer rates or permeabilities of polyethylene for particular volatile chemicals is so high as to preclude the use of or at least greatly restrict the use of polyethylene as closed containers for these chemicals. This is even true for molded containers of polyethylene with walls up to ⅛ inch thick or more, i.e., polyethylene bottles. In such instances, the aforementioned restrictions or limitations can be removed in large part by submitting the entire surface of either the outside or the inside of said polyethylene container to oxidative influences of the oxygen type and then following this surface of polyethylene with a solution of Saran F-120 resin, as mentioned above, and drying this coating by suitable means. In most cases, the coating is applied to the exterior of the polyethylene bottle or container. However, if the volatile chemicals to be placed in the polyethylene container are such as would not react with or loosen the thin film of vinylidene chloride polymer by direct contact in liquid or solid form, the thin vinylidene chloride polymer coat is applied on the interior of the bottle. The treatment of the interior polyethylene container surface is accomplished preferably by filling the polyethylene container with the acid-dichromate solution mentioned heretofore, and by thoroughly draining out this oxidizing solution from the containers and thoroughly rinsing out the interior surface with water, followed by a warm air dry. The vinylidene chloride polymer coating solution is preferably applied by brushing, dipping followed by air spreading, or by spray. Suitable means are provided for drying the coating on the particularly shaped polyethylene container. If desired, printing or decoration is applied to the external vinylidene chloride polymer film coating or preferably to the polyethylene surface before coating.

With the exception of the reference to Figures 14 to 16, and the discussion of the use of a mixed methyl ethyl ketone and acetone solvent, much of what has preceded is found in the disclosure of the aforementioned Keller et al. application.

As previously mentioned, the preferred method of oxidation of the polyethylene film is by the use of a flame. In such a method, however, it is difficult to treat the film uniformly from edge to edge and not burn, damage, or weaken the folds. The edge folds will not stand the full flame, even though the time of treatment is only about ⅟₃₂₀ of a second, when the tubing or film is travelling at the preferred speed of 200 feet per minute, used in all the examples.

If a polyethylene tube is passed through the flame so that the edge folds are at 230, as shown in Figure 14, the folds will be overheated and permanently weakened, causing failure in subsequent use. However, if the length of the flame is adjusted so that the edge folds 230 pass through the tapered regions 232, at each end of the flame, as in Figure 15, these folds will not be damaged. Preferably, the edge folds pass through the center of the tapered regions. By following the above method, it is possible to treat uniformly out over each edge fold. The resulting treatment makes it possible to coat completely both faces of a polyethylene tube and have excellent adhesion throughout. The above recited problems do not occur with threatment of sheeting or film, since there are no edge folds to contend with.

For best results, the polyethylene tubing or sheeting should be flame treated and then either coated with the vinylidene chloride polymer and printed, or printed and then coated with the polymer.

Other, less preferable, procedures comprise (1) printing on polyethylene tubing or sheeting, followed by polyvinylidene chloride polymer coating; (2) coating the polyethylene tubing or sheeting followed by printing over the coating; (3) coating the polyethylene tubing or sheeting followed by flame treatment and printing; (4) printing on the polyethylene tubing or sheeting, followed by flame treatment and vinylidene chloride polymer coating; (5) coating the polyethylene tubing or sheeting followed by printing and then flame treatment, and (6) printing the polyethylene tubing or sheeting followed by coating and then treating.

When printing is not employed, it is preferable to flame-treat the polyethylene tubing or sheeting and then coat with the vinylidene chloride resin, although the alternative procedure is also possible.

In some instances, it has been found extremely advantageous to employ a plurality of flame or other oxidizing treatments. Preferably, the polyethylene tubing or sheeting is flame treated, then coated with the vinylidene chloride polymer (preferably in the aforementioned methyl ethyl ketone-acetone solution), then again flame treated and then printed or an alternative preferred procedure is to flame treat the polyethylene tubing or sheeting, then use printing, again flame-treating and then coating with the vinylidene chloride polymer solution. Less preferable plural oxidizing treatment procedures include (1) coating the polyethylene tubing or sheeting with the vinylidene chloride polymer, flame treating, printing and then again flame treating and (2) printing on the polyethylene tubing or sheeting, flame-treating, coating with the vinylidene chloride polymer and then again flame-treating the surface.

Improved adhesion of the vinylidene chloride polymer coating on top of printing, which has been applied to a flame-treated (or otherwise oxidized) polyethylene tubing or sheeting, has been achieved, if the printed areas of the film are again flame-treated before coating with the vinylidene chloride polymer. The treatment over the ink surfaces should be done immediately prior to coating with the vinylidene chloride polymer for best results, i.e., within a matter of seconds, e.g., 10 seconds, although, on occasion, the interval can be up to a year or more with considerable sacrifice in adhesion. Similarly, it is preferable to print immediately after flame treatment, e.g., 10 seconds (or less), although, in some cases, it is possible to wait a year or more.

Coating immediately after the second flame treatment has proved of importance, especially where coated, bags were subjected to abrasion, hot water dipping procedures, or environments, wherein large amounts of moisture, were apt to condense on the surface of the bags in use. The vinylidene chloride polymer coating on top of the printing protects the printing from external attack and is an excellent overprint varnish, in addition to providing the improvement in gas impedance of the film. Printed bags which have been overcoated in this manner with vinylidene chloride polymer withstand washing in synthetic detergent and soap solutions, both warm and cold, much longer than do bags printed by conventional overprint varnishes.

It has further been found that, in a process involving either (1) flame-treating, printing and vinylidene chloride coating or (2) flame-treating, printing, a second flame-treating and vinylidene chloride polymer coating, considerable improvement is obtained if slip sheeting is resorted to after the coating step. This is so, even if the polyethylene film is only coated on one side, although, it is especially true if the vinylidene chloride polymer coating is done on both sides. Slip sheeting is best done as an integral part of the coating operation and should be carried out as soon as the coating is sufficiently dry to permit contact with the slip sheet material without offset. However, although, less preferably, vinylidene chloride polymer coated polyethylene can be stored, e.g., in festoons, for long intervals before slip sheet.

Newsprint has been found especially desirable as a slip sheet material, although, many other porous materials can be used, e.g., any paper, such as mixed pulp wrapping paper, kraft paper, manila paper, rag paper, filter paper, absorbent paper, oatmeal paper, sulfite paper, cheap cloth, and other textile materials, e.g., coarse gauze, burlaps, cheesecloth, muslin, felt, etc.

The newsprint or other slip sheet material is required after the second side coating operation to accomplish final drying and removal of odor from the film. The newsprint interleaves the turns of polyethylene on the finished roll and acts as an adsorbent and absorbent for the slight amount of solvent still trapped in the coating and in the cavity of the polyethylene tubing, if tubing is being coated. The porous nature of the newsprint also permits some movement of gases through, from, and into the wound rolls. The newsprint also prevents offset of the coating which will occur, due to residual solvent migration, if the coated film is wound coated side to coated side without a porous slip sheet. The newsprint slip sheet also makes it possible to coat at attractive and economical production speeds. Without the use of newsprint, coating speeds would be so slow, or the ovens employed would have to lengthen to such an extent, as to render the production of the film much too costly.

Storage in the slip sheet should be long enough to get rid of residual gases, solvents, and vapors. If the material is dry enough directly out of the drying chamber or oven, storage is not necessary. However, we have found that it is preferable to have a minimum of 4 days' storage to insure removal of sufficient residual solvent, although 3 days' storage has been used on occasion.

The coating of vinylidene chloride polymer on the polyethylene base film gets better with age or storage in the slip sheet and even the gas impedance of the film improves slightly with age.

The vinylidene chloride polymer can have up to 25% or more of plasticizer, although, it is preferable to omit the plasticizer completely.

Flame treatment over a final coated surface tends to harden and further set up the coated surface of vinylidene chloride polymer possibly by removal of residual trace solvents or by permitting molecular readjustment.

To obtain adequate gas impedance of the coated polyethylene film, it is essential that the vinylidene chloride polymer coating be at least 0.0001 inch thick, although, preferably, it is 0.0002 inch or 0.0003 inch thick. The thickness of the coat is controlled by the amount of squeeze-off at the cushion roll on the kiss coater and also, to a somewhat lesser degree, by the viscosity of the coating solution. Therefore, a constant gap between the coating rollers and a constant viscosity for the coating solution should be maintained. The cushion roll is preferably made of a rubbery butadiene-acrylonitrile copolymer of 70 durometer hardness.

The polyethylene employed in the present invention is used as supplied by the producer. Such polyethylene can either be capable of contracting from 3% to 33 or even higher, e.g., 60% 75% and 80%, of its original dimensions when subjected to immersion, e.g., for ten seconds, in boiling water or other heating media or the polyethylene can be substantially non-shrinking. Unless otherwise stated, the polyethylene employed is non-shrinking although it will be realized by those skilled in the art that the shrinking type of polyethylene can normally be used in place thereof.

It has previously been proposed to employ a vinylidene chloride polymer as a flexible bag, e.g., Irons Patent 2,538,002, January 16, 1951, but such bags suffer from the disadvantages of relatively high cost poor sealability, frequent breakage of the vinylidene chloride polymer film, and also breakdown of the vinylidene chloride polymer itself with release of hydrogen chloride which will in many instances adversely effect the contents of the bag.

Lamination of a vinylidene chloride polymer by means of an adhesive to polyethylene has several disadvantages in contrast to the integral coating employed in the present invention. Thus, it is much more expensive, e.g., as much as 100% or more to prepare laminates. Furthermore, the laminates are subject to delamination, and are not as flexible as bags of the present invention. Also, upon standing, laminated bags show an undesirable tendency to curl which is not shown by the present bags. In fact, the bags of the present invention show no substantial aging, but, on the contrary, the union of the polyethylene and the vinylidene chloride polymer actually improves with time.

In the following examples, the polyethylene rolls were progressed at a speed of 200 feet per minute (150 feet per minute gives equivalent results), and the flame had a temperature of about 3500° F. and a thickness of about ⅛ inch. The polyethylene tubing (or film) employed had a width of 8 inches and the width of the flame was adjusted, so that the edge folds passed through the center of the tapered regions at each end of the flame, as shown in Figure 15. The drying ovens were operated at an inlet temperature of 180° F. and an outlet temperature of 110° F. A temperature above 180° F. should be avoided to prevent permanent weakening of the polyethylene.

Example I

Polyethylene film (e.g., Alathon–14) thickness about 0.0015 inch, was flame-treated in the manner shown in Figure 1 and then immediately printed with International Printing Ink Company black ink (in alcohol), as shown in Figure 1. After passing through the drying oven, the film was then again flame-treated on the same side, as shown in Figure 1, and immediately thereafter coated on this side with Saran F–120 resin, 200 centipoise type (vinylidene chloride copolymerized with a minor amount of acrylonitrile) solution, as shown in Figure 11, to give a coating 0.0002 inch thick. The coating solution included 15% by weight of resin and 85% by weight of solvent. The solvent was 75% acetone and 25% methyl ethyl ketone by weight. The viscosity was maintained constant by adding solvent from time to time to replace that which had evaporated. The added solvent also had a 75% to 25% acetone-methyl ethyl ketone ratio. After coating, the film is dried in the press oven. Preferably, a vigorous current of air is moved with the aid of blowers through the press drying oven. Improvement in solvent removal was accomplished by slipsheeting with newsprint after drying.

Example II

In order to print and coat the sheeting on both sides, the procedure of Example I is carried out (without slip sheeting). Then the front-coated polyethylene is subjected to the same procedure again on the uncoated (or back) side. In this case, it is necessary to slip sheet the rewind roll with regular rolls of newsprint after the second coat (and passage through the oven). As previously explained, this not only avoids offset, but also aids in drying the small amount of solvent which has permeated the film during the coating operation to insure removal of odor from the bags formed from the film. The slip sheeting was maintained for 4 days.

Example III

A quicker and more expedient way of coating and/or printing on both sides is shown in the present example, wherein polyethylene tubing (each side being of 0.0015 inch thickness) was flame-treated on both sides, as shown in Figure 16, and then immediately printed on both sides with Bensing and Deeney ink blue–8PB–4/15 (B–1583) in alcohol with the aid of impression cylinders. The polyethylene tubing was then passed through the press drying oven and then retreated with the flame on both sides. Immediately after the second flame treatment, the tubing was coated on both sides with the same Saran F–120 solution as in Example I, in the manner shown in Figure 16. The coated polyethylene tubing was passed through the drying oven and then slip-sheeted at the rewind roll. The coated and slip-sheeted rolls were stored for 5 days at room temperature. Then, the slip sheet was unwound and re-rolled for re-use. The coated polyethylene tubing rolls were then ready to go to the bag machine.

Example IV

Polyethylene tubing was flame-treated edge to edge on both sides and almost immediately thereafter, coated on both sides with the solution of Saran F–120, described in Example I, in the manner shown in Figure 16. The coating was dried with hot air jets and immediately thereafter printed. Alternatively, the coated tubing could be passed through the drying oven, stored and subsequently withdrawn from storage for printing over the dried coating. In this alternative procedure, preferably, the newsprint slip sheet is inserted prior to storage.

Coating with the vinylidene chloride polymer solution according to the present invention can be accomplished by the pressure type roller coater method, knife coating, kiss coating, gravure coating, print coating, reverse roll coating, spray coating, brush coating or any other conventional coating process.

While, preferably, the coating bond is improved by the flame treatment, other methods can be employed to improve the bonding of vinylidene chloride polymers to polyethylene. Thus, it is possible to obtain some improvement by treating polyethylene film electrostatically, with ozone and corona, with sulfuric acid and dichromate, by chlorination or even by ozone oxidation.

It is also possible to coat rubber hydrochloride sheeting, e.g., Pliofilm No. 120 N2 with a thin film of a vinylidene chloride polymer to substantially reduce the gas transmission rate. With rubber hydrochloride, it is not necessary to previously treat the film in any manner prior to coating with the vinylidene chloride polymer. Thus, rubber hydrochloride film about 0.002 inch can be used in Example I, omitting the flame treatment steps, i.e., starting immediately with the vinylidene chloride polymer coating step, to produce a film satisfactorily coated on one side. Rubber hydrochloride tubing (or film) can similarly be satisfactorily coated on both sides in the manner shown in Example III (omitting the flame treatment steps). The use of slip-sheeting, e.g., with newsprint, is also desirable in coating rubber hydrochloride film or tubing.

A preferred rubber hydrochloride material to use is Pliofilm MW 140. This material employs an acrylonitrile rubber as a solid plasticizer for the rubber hydrochloride.

In the claims, the term "strip" is intended to be generic to tubing, sheeting and film.

We claim:

1. A strip for making a substantially gas impermeable polyethylene container having a modified surface and a vinylidene chloride polymer directly integrated with said modified surface of said polyethylene, whereby said polyethylene is rendered substantially impermeable to air, nitrogen, oxygen and carbon dioxide, said strip comprising a polyethylene base having a modified surface and a vinylidene chloride polymer directly integrated with the modified surface of said polyethylene.

2. A strip according to claim 1 wherein the modified surface is an oxidized surface.

3. The process comprising treating the surface of a polyethylene strip for use in making a substantially gas impermeable polyethylene container having a modified surface and a vinylidene chloride polymer directly integrated with said modified surface of said polyethylene, whereby said polyethylene is rendered substantially impermeable to air, nitrogen, oxygen and carbon dioxide, said process comprising uniformly subjecting the surface of the strip to oxidative influences of the oxygen type and then coating said treating surface with a vinylidene chloride polymer so that the vinylidene chloride polymer is directly integrated with the oxidized surface of said polyethylene.

4. A process according to claim 3 wherein the coating of vinylidene chloride polymer is applied as a solution to the treated surface and drying said coating thereon.

5. A substantially gas impermeable polyethylene container having a modified surface and a vinylidene chloride polymer directly integrated with said modified surface of said polyethylene whereby said polyethylene is rendered substantially impermeable to air, nitrogen, oxygen and carbon dioxide.

6. A container according to claim 5 wherein the modified surface is an oxidized surface.

7. A container according to claim 5 wherein the modified surface is an oxidized surface, the container is a bag and the vinylidene chloride polymer is a copolymer of vinylidene chloride with a minor amount of acrylonitrile.

8. A process of treating a polyethylene strip for use in making a substantially gas impermeable polyethylene container having a modified surface and a vinylidene chloride polymer directly integrated with said modified surface of said polyethylene, whereby said polyethylene is rendered substantially impermeable to air, nitrogen, oxygen and carbon dioxide, said process comprising treating the surface of said strip with an oxidizing gas flame and coating the oxidized surface with a vinylidene chloride polymer to directly integrate the same with said surface.

9. A process of rendering a polyethylene container gas impermeable comprising treating the surface of said container with an oxidizing agent and coating the oxidized surface with a vinylidene chloride polymer to directly integrate the same with said surface whereby said polyethylene is rendered substantially impermeable to air, nitrogen, oxygen and carbon dioxide.

10. A process of treating a polyethylene strip for use in making a substantially gas impermeable polyethylene container having a modified surface and a vinylidene chloride polymer directly integrated with said modified surface of said polyethylene, whereby said polyethylene is rendered substantially impermeable to air, nitrogen, oxygen and carbon dioxide, said process comprising treating the surface of said strip with corona discharge and coating the corona discharge treated surface with a vinylidene chloride polymer to directly integrate the same with said surface.

11. A process of rendering a polyethylene container gas impermeable comprising treating the surface of said container with corona discharge and coating the corona discharge treated surface with a vinylidene chloride polymer to directly integrate the same with said surface whereby said polyethylene is rendered substantially impermeable to air, nitrogen, oxygen and carbon dioxide.

12. A process of treating a polyethylene strip for use in making a substantially gas impermeable polyethylene container having a modified surface and a vinylidene chloride polymer directly integrated with said modified surface of said polyethylene, whereby said polyethylene is rendered substantially impermeable to air, nitrogen, oxygen and carbon dioxide, said process comprising treating a surface of the polyethylene strip with an oxidizing agent, printing on the oxidized surface and then coating the printed surface with a vinylidene chloride polymer.

References Cited in the file of this patent

UNITED STATES PATENTS

| | | |
|---|---|---|
| 1,356,356 | Hanish | Oct. 19, 1920 |
| 1,941,328 | Tone | Dec. 26, 1933 |
| 2,474,896 | Hauser | July 5, 1949 |
| 2,628,208 | Loukomsky | Feb. 10, 1953 |
| 2,632,921 | Kreidl | Mar. 31, 1953 |
| 2,639,241 | Cornwell | May 19, 1953 |
| 2,668,134 | Horton | Feb. 2, 1954 |
| 2,683,894 | Kritchever | July 20, 1954 |
| 2,715,076 | Wolinski | Aug. 9, 1955 |

FOREIGN PATENTS

| | | |
|---|---|---|
| 510,068 | Belgium | Apr. 15, 1952 |
| 679,727 | Great Britain | Sept. 24, 1952 |

OTHER REFERENCES

"Saran Resin F–120," Dow Chemical Co., November 1954, pages 10–13.

Notice of Adverse Decision in Interference

In Interference No. 92,377 involving Patent No. 2,968,576, T. W. Keller, C. W. Garvin and J. G. McMillan, PROCESS OF COATING A POLYETHYLENE SUBSTRATE WITH A VINYLIDENE COATING AND RESULTANT ARTICLE, final judgment adverse to the patentees was rendered Dec. 15, 1964, as to claims 1, 2, 3, 5 and 6.

[*Official Gazette March 30, 1965.*]